Figure 1:
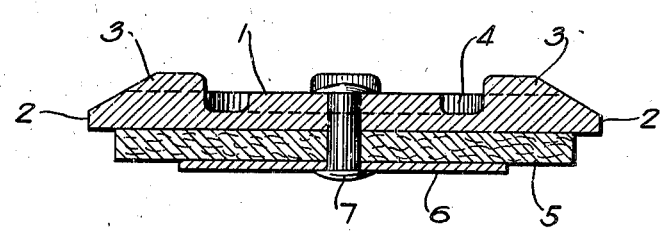

March 8, 1938.  E. E. HEWITT  2,110,705

VALVE

Filed Jan. 15, 1936

INVENTOR
ELLIS E. HEWITT
BY *Wm. M. Cady*
ATTORNEY

Patented Mar. 8, 1938

2,110,705

UNITED STATES PATENT OFFICE 2,110,705

VALVE

Ellis E. Hewitt, Edgewood, Pa., assignor to The Westinghouse Air Brake Company, Wilmerding, Pa., a corporation of Pennsylvania Application January 15, 1936, Serial No. 59,267

1 Claim. (Cl. 251—161)

This invention relates to valve structures and more particularly to check valves such as employed in connection with fluid pressure brake equipment for controlling the flow of fluid under pressure through a communication.

It is customary in fluid pressure brake equipment to provide an air strainer, made from hair or the like, in the connection between the brake pipe and the brake controlling valve device in order to prevent foreign matter, such as pipe scale, from passing from the brake pipe into the brake controlling valve device and causing damage to the internal working parts thereof or causing such device to fail to operate to control the brakes on a car, as desired.

While it is intended that this strainer be periodically cleaned or renewed, it is possible that at some time the strainer will become so clogged with foreign matter that the brake controlling valve device will fail to operate according to variations in brake pipe pressure, as intended. In order to avoid such a failure, a by-pass is provided around the strainer and includes suitably spring pressed check valves, one of which is arranged to permit flow of fluid from the brake pipe to the brake controlling valve device and the other of which is arranged to permit flow of fluid in the reverse direction, in case the strainer becomes so clogged that a sufficient differential of fluid pressures develops across the strainer to unseat the check valves against their seating springs.

While the strainer is functioning properly, the check valves never operate and therefore never leave their seats for long periods of time, due to which, it is possible, with the usual type of check valves, that they will become so stuck to their seats as to prevent them from operating on the differential of pressures intended. This failure of the check valves might result in obtaining an undesired emergency application of the brakes upon the eventual opening of the proper check valve, when the brake pipe pressure is reduced, while upon an increase in brake pipe pressure a failure of the proper check valve to open when intended would result in a delayed release of brakes, either of which results is undesirable.

The check valves heretofore employed have been of the type having a rubber composition seating face, which when pressed against a metal seat rib for a long period of time tends to become stuck to the seat rib, and the principal object of this invention is to provide an improved check valve adapted to obviate this difficulty.

The object is attained by providing the check valve with a pressed fibrous or felt like seating face which will not adhere to a seat rib formed on metal or the like. It is understood that with such a check valve seated against its seat rib, a leak proof seal is not obtained as in the case of rubber faced check valves, since fluid under pressure may filter through the felt past the valve seat, but this is permissible for the use intended since the felt face of the valves will strain out the foreign matter the same as the strainer.

Figure 2:
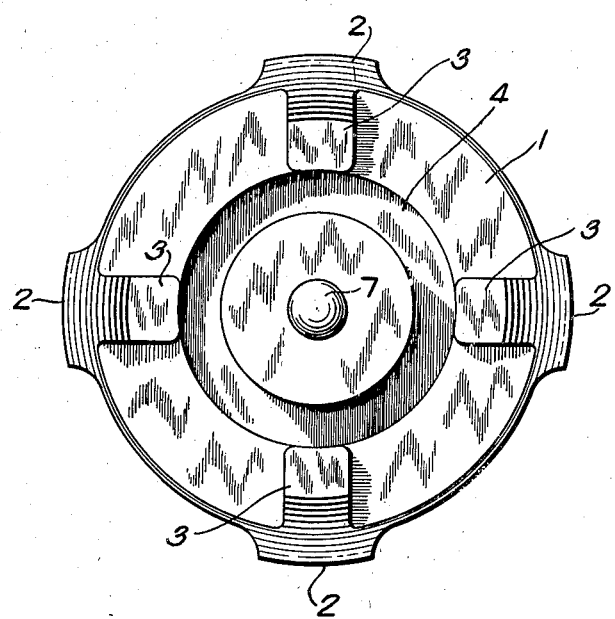

In the accompanying drawing; Fig. 1 is a cross-sectional view of my improved check valve, and Fig. 2 is a plan view of the check valve shown in Fig. 1.

As shown in the drawing, the check valve comprises a rigid disc like body 1 preferably made of insulating material such as bakelite and provided around its periphery with the plurality of spaced, radially projecting guides 2 adapted to centralize and guide the movement of the valve in a bore in which it is adapted to operate, the spaces between said guides being provided to permit flow of fluid under pressure from one side of the valve to the other.

A radially disposed strengthening rib 3 is provided on one face of the valve body 1 opposite each guide 2, these ribs terminating at an annular groove 4 formed centrally in said face of the body. This groove is provided for receiving the end of a pressure spring (not shown) adapted in operation to press the valve against its seat.

The opposite face of the valve body 1 is flat. A disc 5 of felt or similar, compressed, fibrous material is disposed between this flat face on the body 1 and a rigid, preferably metal, washer 6, the disc 5 and washer being secured to the body 1 preferably by a rivet 7 extending through axial openings in said body, disc and washer.

The diameter of the disc 5 is such as to engage the seat rib of a device in which the valve is to be used. The washer 6 is of smaller diameter than disc 5 so as to freely enter the bore within the seat rib adapted to be engaged by said disc, and is provided to support or hold the disc 5 against sagging away from the valve body 1. The valve body 1 provides a rigid backing for the felt disc 5 when the valve is seated, as will be evident.

The disc 5 is preferably waterproofed so that the fibers composing the disc will shed moisture and thereby reduce the possibility of sufficient moisture being present at the valve seat to stick the valve to its seat in case of freezing. The waterproofing also is provided to retard disintegration of the material forming the disc 5.

While one illustrative embodiment of the invention has been described in detail, it is not my intention to limit its scope to this embodiment or otherwise than by the terms of the appended claim.

Having now described my invention, what I claim as new and desire to secure by Letters Patent, is:

A check valve comprising a rigid, circular body having equally spaced radially projecting guides and having on one side a flat face and on the other side a spring receiving annular groove, a felt disc of substantially the same diameter as said body and having one face engaging the flat face of said body, a circular washer of smaller diameter than said felt disc and engaging the opposite face of said felt disc, and a rivet extending through axially aligned openings in said body, disc and washer and securing said felt washer between said body and washer.

ELLIS E. HEWITT.